US012714121B2

(12) United States Patent
Andersen et al.

(10) Patent No.: US 12,714,121 B2
(45) Date of Patent: Aug. 25, 2026

(54) STABILISER-FREE COTTAGE CHEESE, A THICKENED DAIRY LIQUID SUITABLE FOR ITS PRODUCTION, AND RELATED METHODS

(71) Applicant: ARLA FOODS AMBA, Viby J (DK)

(72) Inventors: Claus Andersen, Viby J (DK); Kenneth Pedersen, Viby J (DK)

(73) Assignee: ARLA FOODS AMBA, Viby J (DK)

( * ) Notice: Subject to any disclaimer, the term of this patent is extended or adjusted under 35 U.S.C. 154(b) by 466 days.

(21) Appl. No.: 15/754,680

(22) PCT Filed: Aug. 24, 2016

(86) PCT No.: PCT/EP2016/070020
§ 371 (c)(1),
(2) Date: Feb. 23, 2018

(87) PCT Pub. No.: WO2017/032817
PCT Pub. Date: Mar. 2, 2017

(65) Prior Publication Data
US 2019/0327995 A1 Oct. 31, 2019

(30) Foreign Application Priority Data
Aug. 24, 2015 (EP) .................................... 15182245

(51) Int. Cl.
*A23C 19/076* (2006.01)
*A23C 9/152* (2006.01)
*A23C 9/154* (2006.01)

(52) U.S. Cl.
CPC .......... *A23C 19/076* (2013.01); *A23C 9/1522* (2013.01); *A23C 9/1526* (2013.01); *A23C 9/154* (2013.01)

(58) Field of Classification Search
CPC ..... A23C 9/154; A23C 9/1526; A23C 9/1522; A23C 19/076
(Continued)

(56) References Cited

U.S. PATENT DOCUMENTS 3,117,870 A 1/1964 Hussong et al.
3,830,947 A * 8/1974 Little .................. A23C 13/165 426/582
(Continued)

FOREIGN PATENT DOCUMENTS

CA 890871 A * 1/1972
GB 2063273 A 6/1981
(Continued)

OTHER PUBLICATIONS

Dimitreli et al., "Effect of temperature and chemical composition on processed cheese apparent viscosity." Journal of Food Engineering 2004; 64:265-271.
(Continued)

*Primary Examiner* — Emily M Le
*Assistant Examiner* — Tynesha L McClain
(74) *Attorney, Agent, or Firm* — Lisa Mueller; Casimir Jones SC

(57) ABSTRACT

The present invention pertains to a stabiliser-free cottage cheese, a thickened, stabiliser-free dairy liquid which is suitable as dressing for the cottage cheese and to methods of producing both the thickened dairy liquid and the cottage cheese.

10 Claims, 3 Drawing Sheets

(58) Field of Classification Search
USPC .......................................................... 426/582
See application file for complete search history.

(56) References Cited

U.S. PATENT DOCUMENTS

| | | | | |
|---|---|---|---|---|
| 4,728,516 | A | 3/1988 | Boudreaux et al. | |
| 6,767,575 | B1 * | 7/2004 | Huss .................... | A23C 19/082 426/656 |
| 2005/0142251 | A1 | 6/2005 | Lindstrom et al. | |
| 2005/0170062 | A1 | 8/2005 | Burling et al. | |
| 2007/0134396 | A1 | 6/2007 | Ma et al. | |
| 2008/0305235 | A1 | 12/2008 | Gao et al. | |
| 2014/0141121 | A1 | 5/2014 | Van Den Tempel et al. | |

FOREIGN PATENT DOCUMENTS

| | | | | |
|---|---|---|---|---|
| GB | 2190273 | B | 11/1990 | |
| WO | WO-2006034857 | A2 * | 4/2006 | ............. A23C 21/00 |

OTHER PUBLICATIONS

Fain et al: "Cottage Cheese Whey Derivatives as Ingredients of Cottage Cheese Creaming Mixes", J Dairy Science 1980, 63(6): 905-11.

Singh et al., "Thermal Denaturation, Aggregation and Gelation of Whey Proteins." Advanced Dairy Chemistry 2003, vol. 1, Proteins, 3rd edition, Part B, Chapter 28, pp. 1261-1274.

International Search Report and Written Opinion mailed Oct. 14, 2016, Intl. Appl. No. PCT/EP2016/070020, 14 pages.

Geng et al., "Rheological properties of cold and hot filled model cream cheese." Annual Transactions of the Nordic Rheology Society, vol. 16, 2008, 7 pages.

First Examination Report dated Apr. 27, 2020, Australian Application No. 2016310541, 5 pages.

Antuña, S., et al., Estudio de la Desnaturalización Térmica y Agregación de las Proteínas de Suero por Calorimetría Diferencial de Barrido, Dec. 2009, FABICIB, vol. 13(1), pp. 89-95. DOI:10.14409/fabicib.v13i1.837 (Summary).

* cited by examiner

STABILISER-FREE COTTAGE CHEESE, A THICKENED DAIRY LIQUID SUITABLE FOR ITS PRODUCTION, AND RELATED METHODS

CROSS-REFERENCE TO RELATED APPLICATIONS

This is a U.S. national stage entry of International Patent Application No. PCT/EP2016/070020, filed on Aug. 24, 2016, which claims priority to European Patent Application No. 15182245.9, filed on Aug. 24, 2015, the entire contents of all of which are fully incorporated herein by reference.

FIELD OF THE INVENTION

The present invention pertains to a stabiliser-free cottage cheese, a thickened, stabiliser-free dairy liquid which is suitable as dressing for the cottage cheese and to methods of producing both the thickened dairy liquid and the cottage cheese.

BACKGROUND

Cottage cheese products have been known for long and have traditionally been produced by forming drained curd particles and mixing the curd particles with a dressing consisting of cream or a mixture of milk and cream.

GB 2 190 273A describes the art of cottage cheese production and discloses a new method for stabilising low fat cottage cheese dressings which aims at avoiding the use of guar gum, xanthan and other carbohydrate stabillisers. GB 2 190 273A proposes to use a combination of milk, acid whey and non-denatured whey protein concentrate for producing acidic dressing for cottage cheese and observes increased viscosities when using considerable amounts of whey protein. However, GB 2 190 273A neither disclose the use of acid-gellable whey protein aggregates nor a method of producing near-pH neutral cottage cheese dressings.

Fain et al (Cottage Cheese Whey Derivatives as Ingredients of Cottage Cheese Creaming Mixes, Journal of dairy science, vol. 63, no. 6, 1 Jun. 1980, pages 905-911) discloses cottage cheese dressings comprising cream, a carbohydrate stabilizer (containing vegetable gums, sucrose, carrageenan, and salt) and:

- UF concentrated cottage cheese whey,
- pH neutralized, lactose-hydrolysed cottage cheese whey, or
- vacuum evaporated cottage cheese whey.

However, Fain et al does not disclose any details relating to the presence or non-presence of acid gellable whey protein aggregates in the creaming mixes.

US 2007/134396A1 discloses a method of modifying whey, and in particular a method of thermally treating whey at low protein concentrations and within a predetermined pH range. US 2007/134396A1 furthermore describes a processed cheese, and in particular a processed cheese with low levels of casein protein and high moisture using the thermally modified whey to maintain the desired cheese firmness. The modified whey is prepared by thermally treating whey having a protein concentration from about 4 to about 7.5 percent and a pH from about 6 to about 7.6 at e.g. 82 degrees C. The modified whey is subsequently concentrated and used in the processed cheese recipe. However, US 2007/134396A1 neither discloses thickened cottage cheese dressing type liquid nor a cottage cheese product.

US 2005/142251 A1 discloses a cream cheese product prepared using an edible fat and polymerized whey protein as a protein source, obtainable from a whey protein concentrate. The polymerized whey protein of US 2005/142251 A1 is produced by:

- preparing an aqueous suspension having a protein concentration of about 5 to about 20 percent from water and a whey protein concentrate;
- adjusting the pH of the aqueous suspension, if necessary, to a pH of about 7 to about 9; and
- heating the aqueous suspension in a single heat treatment step to a temperature of about 70 to about 95° C. for a time sufficient to obtain a polymerized whey protein having about 30 to about 85 percent disulfide cross-linking.

U.S. Pat. No. 3,117,870 discloses an improved process for the manufacture of cottage cheese having increased shelf life, comprising the steps of:

- subjecting the milk to high temperature treatment to effect at least about 40 percent denaturation of its serum protein,
- setting the milk to form cottage cheese curd and whey,
- cutting the curd at an acidity of between about 0.40 percent and about 0.44 percent, and thereafter
- subjecting the curd to a heat treatment that is equivalent to a heat treatment at a temperature of about 130° F. for at least about 45 minutes, and
- packaging said curd in containers while maintaining said curd at a temperature of at least 130° F.

SUMMARY OF THE INVENTION

The present inventors have discovered that it is problematic and difficult to produce heat-treated, low fat, near pH-neutral cottage cheese dressings based on the prior art teachings, particularly if the use of carbohydrate-based stabilisers should be reduced or even avoided.

However, the inventors have discovered that, surprisingly, such heat-treated dressings may be prepared by using acid-gellable whey protein aggregates for the production of heat-treated, thickened dairy liquid and by provoking the thickening by addition of chloride salt(s) instead of acidification. These dressings have been found to provide a pleasant, viscous mouthfeel with only a very low level or even no detectable graininess, despite the fact that the liquids have been exposed to significant heat-treatment.

Thus, an aspect of the invention pertains to a method of producing a heat-treated, thickened dairy liquid comprising added chloride salt of $Na^+$, $K^+$ and/or $Ca^{2+}$ and having a pH in the range of 5.0-8, the method comprising the steps of:

a) providing a liquid dairy base comprising milk fat, milk protein, and acid-gellable whey protein aggregates, said dairy base having a pH in the range of 5.0-8, b) optionally, homogenizing the dairy base, c) heat-treating the dairy base at a temperature of at least 70 degrees C. for a duration sufficient to obtain at least a factor $10^5$ reduction in the number of colony forming units of the dairy base, and d) cooling the dairy base to at most 10 degrees C., thereby obtaining the thickened dairy liquid, said method furthermore comprising adding chloride salt of $Na^+$, $K^+$ and/or $Ca^{2+}$ to the dairy base before and/or after the heat-treatment of step c) in an amount sufficient to obtain a total amount of added chloride salt of $Na^+$, $K^+$ and $Ca^{2+}$ of the thickened dairy liquid in the range of 0.1-3% (w/w).

Yet an aspect of the invention pertains to a heat-treated, thickened dairy liquid comprising added chloride salt of $Na^+$, $K^+$ and/or $Ca^{2+}$, and comprising substantially no carbohydrate-based stabilisers, said thickened dairy liquid:

having a pH in the range of 5.0-8, and comprising a total amount of $Na^+$, $K^+$, $Ca^{2+}$, and $Cl^-$ in the range of 0.4-3.8% (w/w).

A further aspect of the invention pertains to a method of producing a cottage cheese containing substantially no carbohydrate-based stabilisers, the method comprising the steps of:

i) providing drained curd particles, ii) preparing a heat-treated, thickened dairy liquid using a method described herein or providing the heat-treated, thickened dairy liquid described herein, and iii) mixing the drained curd particles with the thickened dairy liquid so that the final cottage cheese comprises at least 30% (w/w) of the heat-treated, thickened dairy liquid.

Another aspect of the invention pertains to a cottage cheese containing substantially no carbohydrate-based stabilisers, the cottage cheese comprising:

at least 30% (w/w) drained curd particles, and at least 30% (w/w) of the heat-treated, thickened dairy liquid described herein.

DETAILED DESCRIPTION OF THE INVENTION

Figure 1:
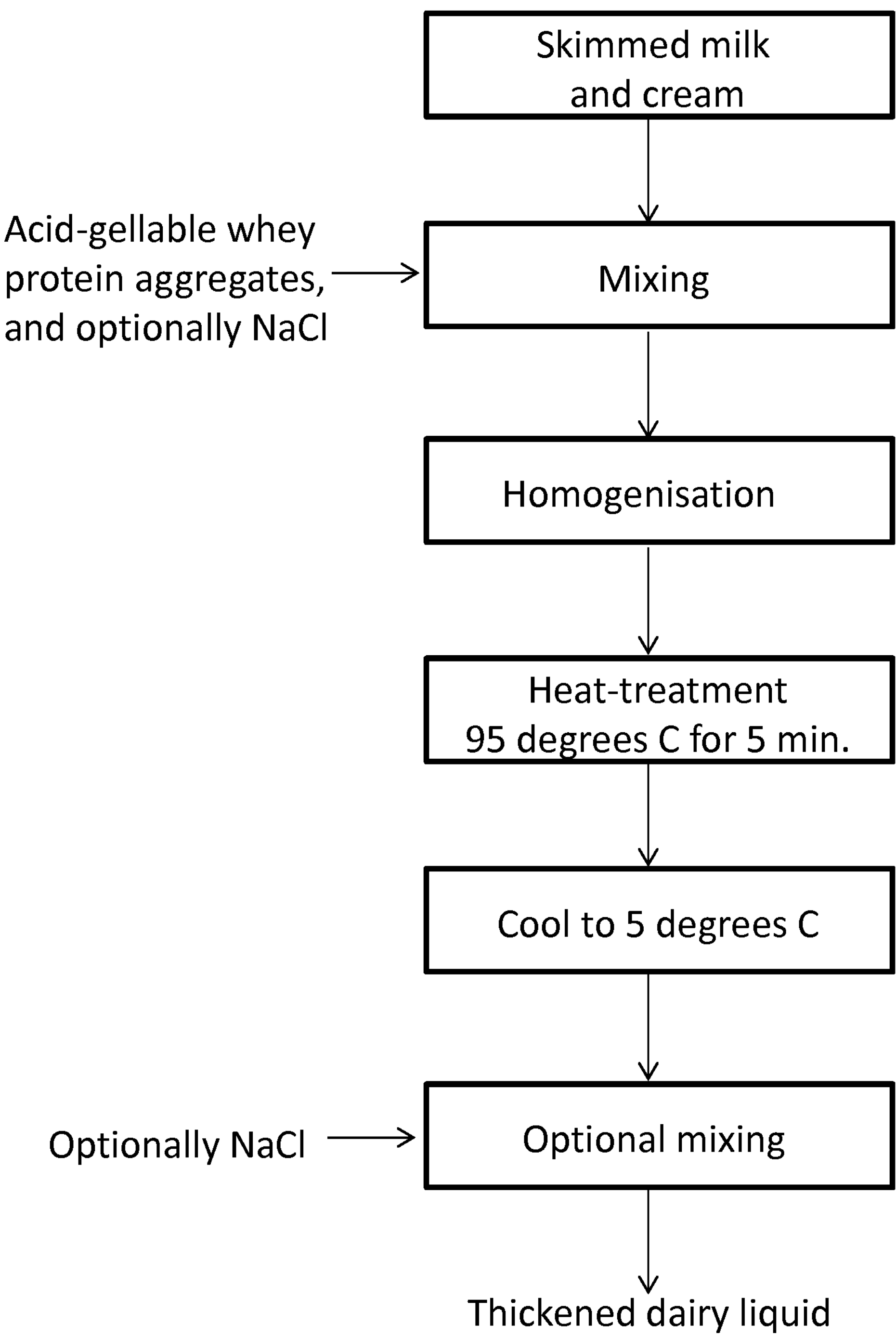
FIG. 1 shows a schematic illustration of an embodiment of the method of producing the thickened dairy liquid of the invention.
Figure 2:
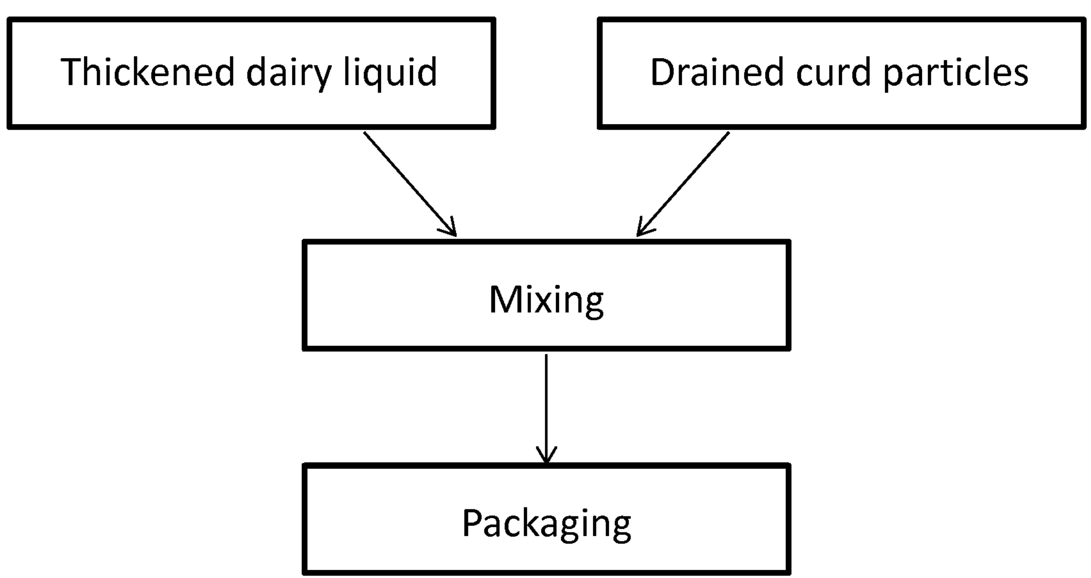
FIG. 2 shows a schematic illustration of an embodiment of the method of producing the cottage cheese of the invention.

Thus, an aspect of the invention pertains to a method of producing a heat-treated, thickened dairy liquid comprising added chloride salt of $Na^+$, $K^+$ and/or $Ca^{2+}$ and having a pH in the range of 5.0-8, the method comprising the steps of:

a) providing a liquid dairy base comprising milk fat, milk protein, and acid-gellable whey protein aggregates, said dairy base having a pH in the range of 5.0-8, b) optionally, homogenizing the dairy base, c) heat-treating the dairy base at a temperature of at least 70 degrees C. for a duration sufficient to obtain at least a factor $10^5$ reduction in the number of colony forming units of the dairy base, and d) cooling the dairy base to at most 10 degrees C., thereby obtaining the thickened dairy liquid, said method furthermore comprising adding chloride salt of $Na^+$, $K^+$ and/or $Ca^{2+}$ to the dairy base before and/or after the heat-treatment of step c) in an amount sufficient to obtain a total amount of added chloride salt of $Na^+$, $K^+$ and $Ca^{2+}$ of the thickened dairy liquid in the range of 0.1-3% (w/w).

In the context of the present invention, the term “thickened dairy liquid” pertains to an aqueous liquid or suspension, the solids of which are primarily derived from milk or milk-related products. The thickened dairy liquid typically has a milky white appearance but is thicker and has a more viscous consistency than full fat milk. The thickened dairy liquid has a pH in the range of 5.0-8, and preferably in the range of pH 6-8.

As said, step a) involves the provision of providing a liquid dairy base comprising milk fat, milk protein, and acid-gellable whey protein aggregates, said dairy base having a pH in the range of 5.0-8.

In the context of the present invention the terms“liquid dairy base” and “dairy base” are used interchangeably.

In some preferred embodiments of the invention the liquid dairy base contains at least 0.2% (w/w) acid-gellable whey protein aggregates. Preferably, the dairy base contains at least 0.4% (w/w). Even more preferably, the dairy base contains at least 0.6% (w/w), such as e.g. at least 0.8% (w/w) acid-gellable whey protein aggregates.

In the context of the present invention, the term “acid-gellable whey protein aggregate” pertains to aggregates of denatured whey proteins which aggregates are capable of forming strong gels (much stronger than native whey protein) during acidification to pH 4.6 and which aggregates typically have linear, worm-like, branched or chain-like shapes and are typically of sub-micron size. The acid-gellable whey protein aggregates may be prepared by heat-denaturation of a demineralised whey protein solution having a pH in the range of 6-8 at a temperature of at least 68 degrees C. for at most 60 minutes with or without shear forces acting on the whey protein during the denaturation.

Sources of acid-gellable whey protein aggregates may be produced by heat-denaturation of dissolved whey protein in the range of 1-5% (w/w) and with a reduced level of calcium. Examples of the production of sources of acid-gellable whey protein aggregates can be found in U.S. Pat. No. 5,217,741, US 2008/305235A1 and in WO07110411 (referred to as linear aggregates), which are incorporated herein by reference.

The concentration of acid-gellable whey protein aggregates is quantified according to Example 1.1.

In the context of the present invention, the term “whey protein” relates to the proteins which are present in the serum phase of either milk or coagulated milk. The proteins of the serum phase of milk are sometimes also referred to as milk serum proteins or ideal whey. When used herein the term “whey protein” both encompasses the native whey proteins and whey protein in denatured and/or aggregated form.

In the context of the present invention, the phrase “Y and/or X” means “Y” or “X” or “Y and X”. Along the same line of logic, the phrase “$n_1$, $n_2$ . . . , $n_{i-1}$, and/or $n_i$“means” $n_1$” or “$n_2$” or . . . or “$n_{i-1}$” or “$n_i$” or any combination of the components: $n_1$, $n_2$, . . . $n_{i-1}$, and $n_i$.

In the context of the present invention, the term “whey” relates to the liquid composition which is left when casein has been removed from milk. Casein may e.g. be removed by microfiltration providing a liquid permeate which is free of or essentially free of micellar casein but contains the native whey proteins. This liquid permeate is sometimes referred to as ideal whey, serum or milk serum.

Alternatively, the casein may be removed from milk by contacting a milk composition with rennet enzyme, which cleavages kappa-casein into para-kappa-casein and the peptide caseinomacropeptide (CMP), thereby destabilising the casein micelles and causing casein to precipitate. The liquid surrounding the rennet precipitated casein is often referred to as sweet whey and contains CMP in addition to the whey proteins which are normally found in milk.

Casein may also be removed from milk by acid precipitation, i.e. reducing the pH of the milk below pH 4.6 which is the isoelectric point of casein and which causes the casein micelles to disintegrate and precipitate. The liquid surrounding the acid precipitated casein is often referred to as acid whey or casein whey and does not contain CMP.

The liquid dairy base may e.g. contain in the range of 0.2-5% (w/w) acid-gellable whey protein aggregates. Preferably, the dairy base contains in the range of 0.4-3% (w/w) acid-gellable whey protein aggregates. Even more preferably, the dairy base contains in the range of 0.6-2% (w/w) acid-gellable whey protein aggregates, such as e.g. in the range of 0.8-1.5% (w/w) acid-gellable whey protein aggregates.

Alternatively, the liquid dairy base may contain in the range of 0.2-2.0% (w/w) acid-gellable whey protein aggregates. Preferably, the dairy base contains in the range of 0.4-1.7% (w/w) acid-gellable whey protein aggregates. Even more preferably, the dairy base contains in the range of 0.5-1.5% (w/w) acid-gellable whey protein aggregates. In some preferred embodiments of the invention, the liquid dairy base contains in the range of 0.6-1.4% (w/w) acid-gellable whey protein aggregates.

It is particularly preferred that the liquid dairy base, and preferably also the obtained thickened dairy liquid, contains substantially no carbohydrate-based stabilisers. The carbohydrate-based stabilisers are typically carbohydrate-based polymers which cause thickening or even gel-formation when added to an aqueous liquid.

Examples of such carbohydrate-based stabilisers are e.g. starch, locust bean gum, guar gum, alginates, cellulose, xanthan gum, carboxymethyl cellulose, microcrystalline cellulose, carrageenans, pectins, inulin, mixtures thereof and derivatives thereof.

In the context of the present invention, the term “substantially no carbohydrate-based stabilisers” means that the total amount of “carbohydrate-based stabilisers” is at most 0.2% (w/w), preferably at most 0.05% (w/w), and even more preferably at most 0.01% (w/w). It is especially preferred that no carbohydrate-based stabilisers are used at all. In this case, both the liquid dairy base and the thickened dairy liquid will be free of carbohydrate-based stabilisers.

The milk, milk protein and/or whey protein used in the present invention are preferably derived from mammalian milk, and even more preferably from ruminant milk, such as e.g. milk from cow, sheep, goat, buffalo, camel, llama, horse and/or deer. In some preferred embodiments of the invention all the dairy-related ingredients are derived from bovine milk.

In the context of the present invention the term “milk protein” pertains to protein found in milk and/or derivable from milk. The term milk protein encompasses e.g. caseins, caseinates, and whey proteins, both in native form and in modified form (e.g. denatured or glycosylated). The caseins are preferably present in the liquid dairy base in their micellar form.

In some preferred embodiments of the invention the milk protein contains at least 30% (w/w) micellar casein relative to the total amount of protein of the liquid dairy base, preferably at least 50% (w/w) and even more preferred at least 70% (w/w).

For example the milk protein may contain at least 80% (w/w) micellar casein relative to the total amount of protein of the liquid dairy base, such least at least 90% (w/w) and even more preferred at least 95% (w/w) micellar casein relative to the total amount of protein of the liquid dairy base.

Suitable sources of milk protein are e.g. liquid milk or milk powder, non-denatured whey protein concentrate, microparticulated whey protein, milk protein concentrate, micellar casein isolate, and combinations thereof.

The liquid dairy base may contain a range of milk protein concentrations.

In some high protein applications it is preferred that the dairy base comprises at least 5% (w/w) milk protein, preferably at least 7% (w/w) milk protein and even more preferably at least 10% (w/w) milk protein.

For example, the dairy base may comprise in the range of 5-20% (w/w) milk protein, e.g. in the range of 7-15% (w/w) milk protein, or e.g. in the range of 8-12% (w/w) milk protein.

Alternatively, it may be of interest to reduce the protein content of the final thickened dairy liquid. Thus, in some preferred embodiments of the invention the dairy base comprises at most 8% (w/w) milk protein, preferably at most 6% (w/w) milk protein and even more preferably at most 5% (w/w) milk protein.

For example, the dairy base may comprise in the range of 1-8% (w/w) milk protein, preferably in the range of 2-6% (w/w) milk protein, and even more preferably in the range of 3-5% (w/w) milk protein.

The present inventors have found that reducing the amount of native whey proteins in the liquid dairy base reduces the risk of formation of graininess in the thickened dairy liquid.

In some preferred embodiments of the invention, the liquid dairy base comprises a total amount of native alpha-lactabumin, beta-lactoglobulin and CMP of at most 3.0% (w/w). Preferably, the liquid dairy base comprises a total amount of native alpha-lactabumin, beta-lactoglobulin and CMP of at most 2.5% (w/w). Even more preferably, the liquid dairy base comprises a total amount of native alpha-lactabumin, beta-lactoglobulin and CMP of at most 2.0% (w/w). In other preferred embodiments if the invention, the liquid dairy base comprises a total amount of native alpha-lactabumin, beta-lactoglobulin and CMP of at most 1.5% (w/w).

For example, the liquid dairy base may comprise a total amount of native alpha-lactabumin, beta-lactoglobulin and CMP in the range of 0-3.0% (w/w). Preferably, the liquid dairy base comprises a total amount of native alpha-lactabumin, beta-lactoglobulin and CMP in the range of 0.2-2.5% (w/w). Even more preferably, the liquid dairy base comprises a total amount of native alpha-lactabumin, beta-lactoglobulin and CMP in the range of 0.5-2.0% (w/w).

The amounts of native alpha-lactabumin, beta-lactoglobulin and CMP are determined according to Example 1.2.

The liquid dairy base furthermore typically contains the carbohydrates, e.g. lactose, and minerals found in milk products. The carbohydrate content of the liquid dairy base is typically at most 10% (w/w), preferably at most 5% (w/w) and even more preferably at most 2% (w/w). For low carb-applications even lower contents of carbohydrate may be useful, thus the carbohydrate content of the liquid dairy base may e.g. be at most 1% (w/w), preferably at most 0.1% (w/w) and even more preferably at most 0.01% (w/w).

For low lactose or lactose-free applications, the content of lactose of the liquid dairy base may e.g. be at most 1% (w/w), preferably at most 0.1% (w/w) and even more preferably at most 0.01% (w/w).

The liquid dairy base of step a) may be provided in many different ways.

In some preferred embodiments of the invention, the dairy base is provided by mixing milk, and optionally also cream, with a powder comprising the acid-gellable whey protein aggregates.

The powder or liquid suspension comprising the acid-gellable whey protein aggregates is typically modified whey protein powder and typically does not contain casein. Alternatively, the source of acid-gellable whey protein aggregates may be a liquid suspension of acid-gellable whey protein aggregates.

Thus, the dairy base may alternatively be provided by mixing milk, and optionally also cream, with a liquid suspension comprising the acid-gellable whey protein aggregates. When one or more powdered ingredients are used for the preparation of the liquid dairy base, it is typically preferred to mix the powdered ingredients thoroughly into the liquid (e.g. water or milk) and subsequently allow the ingredient to hydrate and swell. The mixture of powdered ingredient(s) and liquid is typically allowed to swell for at least 0.5 h and typically at a temperature of at most 10 degrees C. Preferably, the duration of the swelling is at least 1 h and takes place at approx. 5 degrees C.

In other preferred embodiments of the invention, the dairy base is provided by mixing milk powder, and optionally also cream or cream powder, with an aqueous liquid comprising the acid-gellable whey protein aggregates. It is possible to homogenise the aqueous liquid comprising the acid-gellable whey protein aggregates prior to mixing with the milk powder and to omit the homogenisation of step b).

In other embodiments of the invention, the dairy base is provided by mixing milk powder, powder comprising the acid-gellable whey protein aggregates, and optionally also cream powder, with water.

The dairy base typically contains fat, and in some embodiments of the invention it comprises at most 35% (w/w) fat, preferably at most 15% (w/w) fat and even more preferably at most 10% (w/w) fat.

In the present context, the term "fat" relates to the total amount of fat of the food product in question, which can be extracted according to the Röse-Gottlieb principle in which an ammoniacal ethanolic solution of the test sample is extracted with diethyl ether and light petroleum, where after the solvents are removed by distillation or evaporation and finally the mass of extracted substances is determined. Hence, the term "fat" includes, but is not limited to, tri-, di- and monoglycerides, free fatty acids, phospholipids, cholesterols and cholesterol esters.

Low fat variants of the thickened dairy liquid are often preferred, thus in some preferred embodiments of the invention the liquid dairy base comprises at most 6% (w/w) fat, preferably at most 4% (w/w) fat and even more preferably at most 2% (w/w) fat.

The fat of the liquid dairy base normally comprises at least some milk fat but may additionally comprise vegetable fat.

In some embodiments the liquid dairy base comprises milk fat and vegetable fat in a weight ratio in the range of 5:95-95:5, such as e.g. in the range of 10:90-90:10, or in the range of 30:70-70:30.

However, it is often preferred that the fat of the liquid dairy base consists essentially of milk fat.

The phrase "consists essentially of" means that the object, method, or method step in question is limited to the specifically mentioned features or process steps and to those that do not materially affect the basic and novel characteristics of the invention. The term "consists essentially of" also encompasses the embodiment wherein the object, method, or method step in question consists of the specifically mentioned features or process steps.

Thus, in some preferred embodiments of the invention, the fat of the dairy base comprises, or even consists essentially of, milk fat.

In the context of the present invention, the term "milk fat" pertains to the lipids that can be separated from ruminant milk, e.g. bovine milk, including e.g. triglycerides, phospholipids and other lipid species.

It is particularly preferred that a substantial part of the milk fat is present in the form of milk fat globules, e.g. in native form or in homogenised form. For example, at least 70% (w/w) of the milk fat may be present in the form of milk fat globules. Preferably, at least 90% (w/w) of the milk fat is present in the form of milk fat globules. Even more preferably, at least 95% (w/w) of the milk fat is present in the form of milk fat globules, such as e.g. substantially all of the milk fat.

If the fat of the liquid dairy base primarily contains milk fat, it is often preferred that at least 90% (w/w) of the fat is milk fat globules. Preferably, at least 95% (w/w) of the fat may be milk fat globules. Even more preferably, at least 95% (w/w) of the fat may be milk fat globules, such as e.g. substantially all of the fat.

The present invention is very useful for the preparation of food products having a relatively high protein to fat ratio. In some preferred embodiments of the invention the dairy base has a weight ratio between protein and fat of at least 1, preferably at least 1.5 and even more preferably at least 2, such as at least 3.

Even higher ratios may be preferred for low fat preparations. Thus, the dairy base may e.g. have a weight ratio between protein and fat of at least 5, preferably at least 10 and even more preferably at least 30, such as at least 50.

For example, the dairy base may have a weight ratio between protein and fat in the range of 1-100, e.g. in the range of 1.5-50, such as e.g. in the range of 2-30, or e.g. in the range of 3-20.

This solids content of the liquid dairy base depends on the exact composition of the dairy base, however it is typically in the range of 10-40% (w/w), preferably in the range of 12-30% (w/w) and even more preferably in the range of 14-25% (w/w).

The pH of the liquid dairy base is preferably in the neutral to near-neutral range, i.e. in the range of pH 5.0-8. Preferably the pH of the liquid dairy base is in the range of 6.0-8.0. Even more preferably, the pH of the liquid dairy base is in the range of 6.5-8.0. Even more preferably, the pH of the liquid dairy base is in the range of 6.5-7.5. pH values are measured at 20 degrees C. unless it is state otherwise.

Step b) The method of producing the heat-treated, thickened dairy liquid furthermore comprises a step b) of optionally homogenizing the liquid dairy base. In some preferred embodiments of the invention the method comprises the step b). However, in some embodiments of the invention the method does not contain the step b).

The homogenisation of step b) is particularly preferred if the liquid dairy base contains milk fat globules which should be reduced in size in order to increase viscosity and/or creaminess of the liquid dairy base, or if the liquid dairy base contains powder ingredients which could benefit from a homogenisation step.

The homogenization of step b) may involve one or more homogenization steps. In some preferred embodiments of the invention the homogenization involves at least one valve homogenisation step employing a pressure drop of at least 150 bar, preferably at least 180 bar, and even more preferably at least 200 bar. The valve homogenisation may e.g. be implemented as a one-stage homogenisation or a two-stage homogenisation.

In step c) the liquid dairy base is heat-treated at a temperature of at least 70 degrees C. for a duration sufficient to obtain at least a factor $10^5$ reduction in the number of colony forming units (cfu) of the liquid dairy base. This cfu-reduction may for example be accomplished by heating the liquid dairy base to 72 degrees C. with a holding time of 15 seconds.

The determination of cfu-reduction is determined according to the National Standard Method F23 of the NHS (Issue date Mar. 5, 2005; ref. no. F2311.4) using *Escherichia coli* NCTC 9001 as the microorganism to be reduced in number.

In some preferred embodiments of the invention, the liquid dairy base is heat-treated at a temperature of at least 70 degrees C. for a duration sufficient to obtain at least a factor $10^6$ reduction in the number of cfu of the liquid dairy base, such as e.g. at least a factor $10^7$ reduction in the number of cfu, or e.g. at least a factor $10^8$ reduction in the number of cfu.

In addition to killing microorganisms, the heat-treatment may also be used to denature native whey protein present in liquid dairy base, which typically gives a slight increase in the viscosity of the heat-treated liquid dairy base.

In some embodiments of the invention the liquid dairy base is heat-treated at a temperature of at least 80 degrees C. with a holding time of at least 2 minutes, preferably at least 5 minutes, and even more preferably at least 10 minutes. For example, the liquid dairy base may be heat-treated at a temperature in the range of 80-95 degrees C. with a holding time of at least 2 minutes, preferably at least 5 minutes, and even more preferably at least 10 minutes.

In some embodiments of the invention the liquid dairy base is heat-treated at a temperature of at least 90 degrees C. with a holding time of at least 1 minute, preferably at least 2 minutes, and even more preferably at least 5 minutes. For example, the liquid dairy base may be heat-treated at a temperature in the range of 90-100 degrees C. with a holding time of at least 1 minute, preferably at least 2 minutes, and even more preferably at least 5 minutes.

The inventors have observed that a significant increase in the viscosity of the liquid dairy base seems to take place during the heat-treatment step.

Step d) involves cooling the dairy base to at most 10 degrees C., preferably immediately after the heat-treatment step thereby obtaining the thickened dairy liquid.

Step d) may furthermore comprise the addition of one or more further ingredient into the cooled dairy base. Such one or more further ingredients could e.g. be one or more spice(s), one or more herb(s) or other kinds of flavourants and/or chloride salt.

The method comprises adding chloride salt of $Na^+$, $K^+$ and/or $Ca^{2+}$ to the dairy base before and/or after the heat-treatment of step c) in an amount sufficient to obtain a total amount of added chloride salt of N, K, Ca of the thickened dairy liquid in the range of 0.1-3% (w/w).

The salt may contain a combination of chloride salts of different metal ions selected from $Na^+$, $K^+$ and $Ca^{2+}$, or it may be a substantially pure preparation of a chloride salt of a single metal ion selected from $Na^+$, $K^+$ and $Ca^{2+}$.

It is important that the salt is safe and suitable for human consumption and it is preferred that the salt has regulatory GRAS-status (generally recognized as safe).

The added chloride salt of $Na^+$, $K^+$ and/or $Ca^{2+}$ may for example comprise, or even consists essentially of, one or more salts selected from the group consisting of NaCl, KCl, $CaCl_2$, and a combination thereof.

In some preferred embodiments of the invention the added chloride salt of $Na^+$, $K^+$ and/or $Ca^{2+}$ may for example at least comprise, or even consists essentially of, NaCl.

It may be preferred that at least 90% (w/w) of the added chloride salt of $Na^+$, $K^+$ and $Ca^{2+}$ is NaCl, more preferably at least 95% (w/w), and even more preferably substantially all.

It should be noted that most commercial salt preparations contain some impurities and optionally also additives that are added either for nutritional or process technical purposes. Such Impurities and additives should not be counted unless they are chloride salts of $Na^+$, $K^+$ and/or $Ca^{2+}$.

The inventors have found that it is advantageous to add at least some of the chloride salt prior to the heat-treatment.

The chloride salt may e.g. be added in solid form, in dissolved form, or in the form of a saturated aqueous salt slurry containing both dissolved salt and crystals of solid salt.

In some preferred embodiments of the invention at least 10% (w/w) of the total amount of added chloride salt of $Na^+$, $K^+$ and $Ca^{2+}$, e.g. NaCl, is added before the heat-treatment and the rest is added after the heat-treatment. For example, at least 20% (w/w) of the total amount of added chloride salt of $Na^+$, $K^+$ and $Ca^{2+}$ may be added before the heat-treatment. Alternatively, at least 30% (w/w) of the total amount of added chloride salt of $Na^+$, $K^+$ and $Ca^{2+}$ may be added before the heat-treatment. At least 40% (w/w) of the total amount of added chloride salt of $Na^+$, $K^+$ and $Ca^{2+}$ may e.g. be added before the heat-treatment.

The chloride salt of $Na^+$, $K^+$ and/or $Ca^{2+}$, e.g. NaCl, may e.g. be added prior to the heat treatment in an amount of at least 0.2% (w/w) relative to the weight of the liquid dairy base. For example, the chloride salt of $Na^+$, $K^+$ and/or $Ca^{2+}$, e.g. NaCl, may be added prior to the heat treatment in an amount of at least 0.4% (w/w). Alternatively, the chloride salt of $Na^+$, $K^+$ and/or $Ca^{2+}$, e.g. NaCl, may be added prior to the heat treatment in an amount of at least 0.5% (w/w).

The chloride salt of $Na^+$, $K^+$ and/or $Ca^{2+}$, e.g. NaCl, may e.g. be added prior to the heat treatment in an amount in the range of 0.1-2% (w/w) relative to the weight of the liquid dairy base. For example, the chloride salt of $Na^+$, $K^+$ and/or $Ca^{2+}$, e.g. NaCl, may be added prior to the heat treatment in an amount in the range of 0.4-1.5% (w/w). Alternatively, the chloride salt of $Na^+$, $K^+$ and/or $Ca^{2+}$, e.g. NaCl, may be added prior to the heat treatment in an amount in the range of 0.5-1.2% (w/w). For example, the chloride salt of $Na^+$, $K^+$ and/or $Ca^{2+}$, e.g. NaCl, may be added prior to the heat treatment in an amount in the range of 0.4-1.2% (w/w).

In some preferred embodiments of the invention, the chloride salt of $Na^+$, $K^+$ and/or $Ca^{2+}$, e.g. NaCl, may be added prior to the heat treatment in an amount in the range of 0.4-1.0% (w/w). Preferably, the chloride salt of $Na^+$, $K^+$ and/or $Ca^{2+}$, e.g. NaCl, may be added prior to the heat treatment in an amount in the range of 0.4-0.8% (w/w), such as e.g. in the range of 0.5-0.7% (w/w).

Preferably, the chloride salt of $Na^+$, $K^+$ and/or $Ca^{2+}$, e.g. NaCl, may be added prior to the heat treatment in an amount in the range of 0.4-0.8% (w/w), such as e.g. in the range of 0.5-0.7% (w/w).

The present inventors have observed that for lower concentrations of acid-gellable whey protein aggregates it is advantageous to use a relatively high content of chloride salt added prior to the heat-treatment step, whereas increasing amounts of acid-gellable whey protein aggregates require less added chloride salt prior to the heat-treatment.

Thus, in some preferred embodiments of the invention:

the chloride salt of $Na^+$, $K^+$ and/or $Ca^{2+}$, preferably NaCl, is added prior to the heat treatment in an amount in the range of 1.5-2.0% (w/w) and the liquid dairy base comprises an amount of acid-gellable whey protein aggregates in the range of 0.4-0.72% (w/w), the chloride salt of $Na^+$, $K^+$ and/or $Ca^{2+}$, preferably NaCl, is added prior to the heat treatment in an amount in the range of 0.3-0.9% (w/w) and the liquid dairy base comprises an amount of acid-gellable whey protein aggregates in the range of 0.73-1.2% (w/w), or the chloride salt of $Na^+$, $K^+$ and/or $Ca^{2+}$, preferably NaCl, is added prior to the heat treatment in an amount in the range of 0.1-0.5% (w/w) and the liquid dairy base comprises an amount of acid-gellable whey protein aggregates in the range of 1.3-1.5% (w/w).

Preferably, the chloride salt of $Na^+$, $K^+$ and/or $Ca^{2+}$, preferably NaCl, is added prior to the heat treatment in an amount in the range of 1.6-1.8% (w/w) and the liquid dairy base comprises an amount of acid-gellable whey protein aggregates in the range of 0.4-0.72% (w/w), the chloride salt of $Na^+$, $K^+$ and/or $Ca^{2+}$, preferably NaCl, is added prior to the heat treatment in an amount in the range of 0.4-0.7% (w/w) and the liquid dairy base comprises an amount of acid-gellable whey protein aggregates in the range of 0.73-1.2% (w/w), or the chloride salt of $Na^+$, $K^+$ and/or $Ca^{2+}$, preferably NaCl, is added prior to the heat treatment in an amount in the range of 0.2-0.4% (w/w) and the liquid dairy base comprises an amount of acid-gellable whey protein aggregates in the range of 1.3-1.5% (w/w).

In other preferred embodiments of the invention:

the chloride salt of $Na^+$, $K^+$ and/or $Ca^{2+}$, preferably NaCl, is added prior to the heat treatment in an amount in the range of 1.5-2.0% (w/w) and the liquid dairy base comprises an amount of acid-gellable whey protein aggregates in the range of 0.4-0.72% (w/w), or the chloride salt of $Na^+$, $K^+$ and/or $Ca^{2+}$, preferably NaCl, is added prior to the heat treatment in an amount in the range of 0.3-0.9% (w/w) and the liquid dairy base comprises an amount of acid-gellable whey protein aggregates in the range of 0.73-1.2% (w/w).

Preferably, the chloride salt of $Na^+$, $K^+$ and/or $Ca^{2+}$, preferably NaCl, is added prior to the heat treatment in an amount in the range of 1.6-1.8% (w/w) and the liquid dairy base comprises an amount of acid-gellable whey protein aggregates in the range of 0.4-0.72% (w/w), or the chloride salt of $Na^+$, $K^+$ and/or $Ca^{2+}$, preferably NaCl, is added prior to the heat treatment in an amount in the range of 0.4-0.7% (w/w) and the liquid dairy base comprises an amount of acid-gellable whey protein aggregates in the range of 0.73-1.2% (w/w).

The remaining chloride salt is added after the heat treatment, and preferably during or after the cooling step.

The total amount of added chloride salt of $Na^+$, $K^+$ and $Ca^{2+}$ of the thickened dairy liquid may vary according to the application of the thickened dairy liquid, but normally it is in the range of 0.1-3% (w/w).

In some embodiments of the invention the total amount of added chloride salt of $Na^+$, $K^+$ and $Ca^{2+}$ of the thickened dairy liquid is in the range of 0.5-2.5% (w/w), preferably in the range of 0.7-2.3% (w/w) and even more preferably in the range of 1.0-2.2% (w/w).

In some embodiments of the invention the total amount of $Na^+$, $K^+$, $Ca^{2+}$, and CI of the thickened dairy liquid, taking both added chloride salt and the inherent salts of the liquid dairy base into account, is in the range of 0.4-3.4% (w/w), preferably in the range of 0.8-2.8% (w/w), preferably in the range of 1.0-2.6% (w/w) and even more preferably in the range of 1.3-2.5% (w/w).

The total amount of total amount of $Na^+$, $K^+$, $Ca^{2+}$, and $Cl^-$ of a food product may e.g. be determined along the lines of Example 1.7 adapting the method for measurement of $Na^+$, $K^+$, and $Cl^-$.

The produced heat-treated, thickened dairy liquid may be packaged as such and sold to the consumers or it may be used for producing another food product.

Thus, the method may furthermore comprise a step of packaging the heat-treated, thickened dairy liquid in a suitable packaging material.

Alternatively, the heat-treated, thickened dairy liquid may be used as an ingredient for the production of another food product.

The present inventors have found that the heat-treated, thickened dairy liquid is particularly well suited as cottage cheese dressing—especially for the production of cottage cheeses that do not contain carbohydrate-based stabilisers.

A particularly preferred embodiment of the invention pertains to a method of producing a heat-treated, thickened dairy liquid comprising added chloride salt of $Na^+$, $K^+$, and/or $Ca^{2+}$ and having a pH in the range of 5.0-8, the method comprising the steps of:

a) providing a liquid dairy base comprising milk fat, milk protein and acid-gellable whey protein aggregates, said dairy base having a pH in the range of 6-8, and said dairy base containing at least 0.2-2% (w/w) acid-gellable whey protein aggregates, b) homogenizing the dairy base, c) heat-treating the liquid dairy base at a temperature of at least 80 degrees C. for a duration sufficient to obtain at least a factor $10^5$ reduction in the number of colony forming units of the liquid dairy base, and d) cooling the liquid dairy base to at most 10 degrees C., thereby obtaining the thickened dairy liquid, said method furthermore comprising adding chloride salt of $Na^+$, $K^+$ and/or $Ca^{2+}$ to the dairy base before and/or after the heat treatment of step c) in an amount sufficient to obtain a total amount of added chloride salt of $Na^+$, $K^+$ and $Ca^{2+}$ of the thickened dairy liquid in the range of 0.5-2.2% (w/w), wherein the chloride salt of $Na^+$, $K^+$ and/or $Ca^{2+}$ is NaCl, and wherein NaCl is added prior to the heat treatment in an amount in the range of 0.1-2% (w/w) relative to the weight of the liquid dairy base.

Yet an aspect of the invention pertains to a heat-treated, thickened dairy liquid comprising added chloride salt of $Na^+$, $K^+$, and/or $Ca^{2+}$, and comprising substantially no carbohydrate-based stabilisers, said thickened dairy liquid:

having a pH in the range of 5.0-8, comprising a total amount of $Na^+$, $K^+$, $Ca^{2+}$, and $Cl^-$ in the range of 0.4-3.8% (w/w).

The thickened dairy liquid may for example be a thickened dairy liquid which is obtainable by the method as described herein.

The dairy liquid is "thickened" in the sense that it is thicker than full fat milk. Preferably, "thickened" also means that the thickened dairy liquid is more viscous than full fat milk.

In some preferred embodiments of the invention, the thickened dairy liquid has a viscosity of at least 20 cP, preferably at least 40 cP and even more preferred at least 60 cP.

The thickened dairy liquid may e.g. have a viscosity of at least 70 cP, preferably at least 100 cP and even more preferred at least 150 cP.

The thickened dairy liquid may e.g. have a viscosity in the range of 20-400 cP, preferably in the range of 40-200 cP and even more preferred in the range of 50-150 cP. Viscosity measurements are made according to Example 1.9.

It is furthermore preferred that the heat-treated, thickened dairy liquid has no detectable graininess when subjected to oral sensory testing.

The heat-treated, thickened dairy liquid typically contains fat, and in some embodiments of the invention it comprises at most 35% (w/w) fat, preferably at most 15% (w/w) fat and even more preferably at most 10% (w/w) fat.

Low fat variants of the heat-treated, thickened dairy liquid are often preferred, thus in some preferred embodiments of the invention the heat-treated, thickened dairy liquid comprises at most 6% (w/w) fat, preferably at most 4% (w/w) fat and even more preferably at most 2% (w/w) fat.

The fat of the heat-treated, thickened dairy liquid normally comprises at least some milk fat but may additionally comprise vegetable fat.

In some embodiments the heat-treated, thickened dairy liquid comprises milk fat and vegetable fat in a weight ratio in the range of 5:95-95:5, such as e.g. in the range of 10:90-90:10, or in the range of 30:70-70:30.

However, it is often preferred that the fat of the heat-treated, thickened dairy liquid consists essentially of milk fat.

Thus, in some preferred embodiments of the invention, the fat of the heat-treated, thickened dairy liquid comprises, or even consists essentially of, milk fat.

It is particularly preferred that at substantial part of the milk fat is present in the form of milk fat globules, e.g. in native form or in homogenised form. For example, at least 70% (w/w) of the milk fat may be present in the form of milk fat globules. Preferably, at least 90% (w/w) of the milk fat is present in the form of milk fat globules. Even more preferably, at least 95% (w/w) of the milk fat is present in the form of milk fat globules, such as e.g. substantially all of the milk fat.

If the fat of the heat-treated, thickened dairy liquid primarily contains milk fat, it is often preferred that at least 90% (w/w) of the fat is milk fat globules. Preferably, at least 95% (w/w) of the fat may be milk fat globules. Even more preferably, at least 95% (w/w) of the fat may be milk fat globules, such as e.g. substantially all of the fat.

The heat-treated, thickened dairy liquid may contain a wide range of protein concentrations.

In some high protein applications it is preferred that the heat-treated, thickened dairy liquid comprises at least 5% (w/w) protein, preferably at least 7% (w/w) protein and even more preferably at least 10% (w/w) protein.

For example, the heat-treated, thickened dairy liquid may comprise in the range of 5-20% (w/w) protein, e.g. in the range of 7-15% (w/w) protein, or e.g. in the range of 8-12% (w/w) protein.

Alternatively, it may be of interest to reduce the protein content of the heat-treated, thickened dairy liquid. Thus, in some preferred embodiments of the invention the heat-treated, thickened dairy liquid comprises at most 8% (w/w) protein, preferably at most 6% (w/w) protein and even more preferably at most 5% (w/w) protein.

For example, the heat-treated, thickened dairy liquid may comprise in the range of 1-8% (w/w) protein, preferably in the range of 2-6% (w/w) protein, and even more preferably in the range of 3-5% (w/w) protein.

The present invention is very useful for preparation of food products having a relatively high protein to fat ratio. In some preferred embodiments of the invention the heat-treated, thickened dairy liquid has a weight ratio between protein and fat of at least 1, preferably at least 1.5 and even more preferably at least 2, such as at least 3.

Even higher ratios may be preferred for low fat preparations. Thus, the heat-treated, thickened dairy liquid may e.g. have a weight ratio between protein and fat of at least 5, preferably at least 10 and even more preferably at least 30, such as at least 50.

For example, the heat-treated, thickened dairy liquid may have a weight ratio between protein and fat in the range of 1-100, e.g. in the range of 1.5-50, such as e.g. in the range of 2-30, or e.g. in the range of 3-20.

The pH of the heat-treated, thickened dairy liquid is preferably in the neutral to near-neutral range, i.e. in the range of pH 5.0-8. Preferably the pH of the heat-treated, thickened dairy liquid is in the range of 6.0-8.0. More preferably, the pH of the heat-treated, thickened dairy liquid is in the range of 6.5-8.0. Even more preferably, the pH of the heat-treated, thickened dairy liquid is in the range of 6.5-7.5.

The present inventors have found that the thickened dairy liquid of the invention provides a good dressing retention when used as a cottage cheese dressing, i.e. the dressing does not separate from the curd particles immediately, when the cottage cheese is applied on a plate or on a piece of bread.

In some preferred embodiments of the invention the thickened dairy liquid, when used as a dressing in a cottage cheese, has a dressing retention of at least 50% (w/w) relative to the total amount of dressing of the cottage cheese at t=180 seconds. Preferably the dressing retention of the thickened dairy liquid, when used as a dressing in a cottage cheese, is at least 55% (w/) at t=180 seconds. Even more preferred, the dressing retention of the thickened dairy liquid, when used as a dressing in a cottage cheese, may be at least 60% (w/) at t=180 seconds. For example, the dressing retention of the thickened dairy liquid, when used as a dressing in a cottage cheese, may be at least 70% (w/) at t=180 seconds.

The dressing retention of a thickened dairy liquid is measured according to Example 1.10 using 45% (w/w) dressing and 55% drained curd particles (w/w).

For example, the thickened dairy liquid, when used as a dressing in a cottage cheese, may have a dressing retention in the range of 50-100% (w/w) relative to the total amount of dressing of the cottage cheese at t=180 seconds. Preferably the dressing retention of the thickened dairy liquid, when used as a dressing in a cottage cheese, is in the range of 55-90% (w/w) at t=180 seconds. Even more preferred, the dressing retention of the thickened dairy liquid, when used as a dressing in a cottage cheese, may be in the range of 60-80% (w/w) at t=180 seconds.

The thickened dairy liquid furthermore typically contains the carbohydrates, e.g. lactose, and minerals found in milk products. The carbohydrate content of the thickened dairy liquid is typically at most 10% (w/w), preferably at most 5% (w/w) and even more preferably at most 2% (w/w). For low carb-applications even lower contents of carbohydrate may be useful, thus the carbohydrate content of the thickened dairy liquid may e.g. be at most 1% (w/w), preferably at most 0.1% (w/w) and even more preferably at most 0.01% (w/w).

For low lactose or lactose-free applications, the content of lactose of the thickened dairy liquid may e.g. be at most 1% (w/w), preferably at most 0.1% (w/w) and even more preferably at most 0.01% (w/w).

This solids content of the heat-treated, thickened dairy liquid depends on the exact composition of the dairy base, however it is typically in the range of 10-40% (w/w), preferably in the range of 12-30% (w/w) and even more preferably in the range of 14-25% (w/w).

Another aspect of the invention pertains to the use of the thickened dairy liquid as an ingredient for the production of a food products. The food product may e.g. be a cheese, for example cottage cheese.

Yet an aspect of the invention pertains to a method of producing a cottage cheese containing substantially no carbohydrate-based stabilisers, the method comprising the steps of:

i) providing drained curd particles, ii) preparing a heat-treated, thickened dairy liquid using a method described herein or providing the heat-treated, thickened dairy liquid described herein, and iii) mixing the drained curd particles with the thickened dairy liquid so that the final cottage cheese comprises at least 30% (w/w) of the heat-treated, thickened dairy liquid.

Step i) involves the provision of drained curd particles. The drained curd particles are preferably conventional, drained curd particles which are obtained during cheese production. The drained curd particles often have uneven shapes and cross-sectional dimension in the order of approx. 2-10 mm.

The drained curd particles are typically prepared by coagulating a cheese milk with a coagulation agent capable of coagulating casein (typically rennet enzyme, an acidification agent, or a combination thereof), cutting the obtained curd in appropriate pieces (e.g. in cubes having a side length of approx. 1 cm) and allowing the whey to drain from the curd pieces. The whey is separated from the curd pieces and drained curd pieces are obtained, also referred to as "drained curd particles". The drained curd particles may furthermore be subjected to washing to remove even more whey material.

The drained curd particles typically have a solids content of at least 15% (w/w) preferably at least 18% (w/) and even more preferred at least 20% (w/w). The solids content of the drained curd particles may e.g. be in the range of 15-40% (w/w), preferably in the range of 18-35% (w/w), and even more preferred in the range of 20-30% (w/w).

In the context of the present invention, the term "solids content" pertains to the solids which remain when water and more volatile components have been removed. The solids content (In weight percent) is determined by first determining the water content (in weight percent) of the composition and subtracting the water content from 100% (the total weight of the composition).

The fat content of the drained curd particles is typically in the range of 0.1-15% (w/w), preferably in the range of 0.2-6% (w/w), an even more preferably in the range of 0.2-2% (w/w), such as e.g. in the range of 0.3-1.0% (w/w).

The protein content of the drained curd particles is typically in the range of 10-38% (w/w), preferably in the range of 12-32% (w/w), an even more preferably in the range of 14-28% (w/w), such as e.g. in the range of 16-26% (w/w).

Step ii) pertains to the preparation of a heat-treated, thickened dairy liquid using the method described herein.

Step iii) of the method involves mixing the thickened dairy liquid and the drained curd particles. The thickened dairy liquid acts as dressing and is intended to cover the at least some of the drained curd particles.

If it is desired to maintain the shape and structure of the drained curd particles, the drained curd particles and the thickened dairy liquid are typically contacted by gentle mixing so as to minimize the disruption of the drained curd particles.

In some preferred embodiments of the invention, the cottage cheese is prepared by mixing at least 40% (w/w) drained curd particles, and at least 40% (w/w) of the heat-treated, thickened dairy liquid described herein. Preferably, the cottage cheese is prepared by mixing at least 50% (w/w) drained curd particles, and at least 45% (w/w) of the heat-treated, thickened dairy liquid described herein. For example, the cottage cheese may be prepared by mixing approx. 55% (w/w) drained curd particles, and approx. 45% (w/w) of the heat-treated, thickened dairy liquid described herein.

The cottage cheese may furthermore contain e.g. herbs and/or spices in addition to the thickened dairy liquid and the drained curd particles.

The final cottage cheese preferably has the visual appearance and sensory characteristics of a conventional, dressing-containing cottage cheese, optionally include herbs and/or spices.

The final cottage cheese is preferably packaged in suitable packaging materials which are suitable for cooled storage (typically approx. 5 degrees C.) of the cottage cheese product. Such packaging materials are well-known to the person skilled in the art.

A further aspect of the invention pertains to a cottage cheese containing substantially no carbohydrate-based stabilisers, the cottage cheese comprising:

at least 30% (w/w) drained curd particles, and at least 30% (w/w) of the heat-treated, thickened dairy liquid described herein.

The cottage cheese may for example be a cottage cheese which is obtainable by the method described herein.

In some preferred embodiments of the invention, the cottage cheese comprises at least 40% (w/w) drained curd particles, and at least 40% (w/w) of the heat-treated, thickened dairy liquid described herein. Preferably, the cottage cheese comprises at least 50% (w/w) drained curd particles, and at least 45% (w/w) of the heat-treated, thickened dairy liquid described herein. For example, the cottage cheese may comprise approx. 55% (w/w) drained curd particles, and approx. 45% (w/w) of the heat-treated, thickened dairy liquid described herein.

The cottage cheese products preferably contain a total amount of protein of at least 10% (w/w).

In some embodiments of the invention the cottage cheese has a total amount of protein of at least 12.0%. Preferably, the cottage cheese has a total amount of protein of at least 14% (w/w). Even more preferably, the cottage cheese has a total amount of protein of at least 15% (w/w).

For example, the cottage cheese may have a total amount of protein in the range of 12-20% (w/w). Preferably, the cottage cheese has a total amount of protein in the range of 13-18% (w/w). Even more preferably, the cottage cheese may have a total amount of protein in the range of 14-17% (w/w).

In some preferred embodiments of the invention the cottage cheese comprises a total amount of fat of at most 5% (w/w), preferably at most 2% (w/w), and even more preferred, at most 1% (w/w).

In some preferred embodiments of the invention the cottage cheese comprises a total amount of fat of at most 5% (w/w) and a total amount of protein in the range of 12-20% (w/w). Preferably, the cottage cheese comprises a total amount of fat of at most 2% (w/w) and a total amount of protein in the range of 13-18% (w/w). Even more preferably the cottage cheese comprises a total amount of fat of at most 2% (w/w) and a total amount of protein in the range of 14-17% (w/w).

An advantage of the cottage cheese of the present invention is that it has a good dressing retention, i.e. the dressing does not separate from the curd particles immediately, when the cottage cheese is applied on a plate or on a piece of bread.

In some preferred embodiments of the invention the cottage cheese has a dressing retention of at least 50% (w/w) relative to the total amount of dressing of the cottage cheese at t=180 seconds. Preferably, the dressing retention of the cottage cheese is at least 55% (w/) at t=180 seconds. Even more preferred, the dressing retention of the cottage cheese may be at least 60% (w/) at t=180 seconds. For example, the dressing retention of the thickened dairy liquid, when used as a dressing in a cottage cheese, may be at least 70% (w/) at t=180 seconds.

The dressing retention is measured according to Example 1.10.

For example, the cottage cheese may have a dressing retention in the range of 50-100% (w/w) relative to the total amount of dressing of the cottage cheese at t=180 seconds. Preferably, the dressing retention of the cottage cheese is in the range of 55-90% (w/) at t=180 seconds. Even more preferred, the dressing retention of the cottage cheese may be in the range of 60-80% (w/) at t=180 seconds.

It should be noted that the embodiments and features described in the context of one of the aspects of the present invention also apply to the other aspects of the invention.

All patent and non-patent references cited in the present application are hereby incorporated by reference in their entirety.

The invention will now be described in further details in the following non-limiting examples.

EXAMPLES

Example 1: Methods of Analysis

Example 1.1: Quantification of Acid-Gellable Whey Protein Aggregates

The amount of acid-gellable whey protein aggregates is determined using the following procedure.

Procedure:

1. Dissolve a sample of approx. 1.00 g powder in a phosphate buffer to obtain 1000 mL. If the sample is in the form of a liquid, then a liquid sample containing approx. 1.00 g dry matter is diluted to 1000 mL with phosphate buffer. Write down the precise dilution factor (typically close to 1000). Allow the dissolved (or diluted) sample to stand for 24 hours before proceeding to step 2.
2. Determine the amount of total protein (true protein) of the dissolved sample as described in example 1.4. The amount of total protein of the dissolved sample is referred to as "X" (% (w/w) total protein relative to total weight of the dissolved sample).
3. Centrifuge 100 mL of the dissolved sample at 62000 g for 30 minutes. The centrifugation is performed at approx. 15 degrees C. using a refrigerated centrifuge 3-30K from SIGMA Laborzentrifugen GmbH and 85 mL tubes (Order no. 15076) or similar equipment. Centrifugation at 62000 g for 30 minutes removes both fat particles and casein micelles from the supernatant.
4. Collect the resulting supernatant and filter it through a 0.22 micron filter to remove traces of microparticles that could damage the HPLC-column of the following HPLC analysis.
5. Determine the total protein (true protein) of the filtered supernatant by using the procedure disclosed in Example 1.4. The amount of total protein of the filtered supernatant is referred to as "Y" (% (w/w) total protein relative to total weight of the filtered supernatant).
6. Quantify the amount (% (w/w) relative to total weight of the filtered supernatant) of native alpha-lactalbumin, beta-lactoglobulin, and caseinomacropeptide using the procedure described in Example 1.2.
7. Calculate the relative amount of acid-gellable whey protein aggregates (% (w/w) acid-gellable aggregates relative to total amount of protein of the original sample). This can be done using the formula:

$$Z_{Relative\ amount\ of\ acid\text{-}gellable\ aggregates}=((Y-C_{alpha}-C_{beta}-C_{CMP})/X)*100\% \text{ (w/w total protein of the original sample)}$$

The absolute amount of acid-gellable whey protein aggregates of the original sample is calculated by multiplying the relative amount of acid-gellable whey protein aggregates with X*dilution factor (going from 1 g sample to 1000 mL (=approx. 1000 g) dissolved sample gives a dilution factor of 1000). The formula looks like this:

$$\text{Absolute amount of acid-gellable whey protein aggregates of the original sample}=Z_{Relative\ amount\ of\ acid\text{-}gellable\ whey\ protein\ aggregates}*X*\text{dilution factor}$$

Example 1.2: Determination of Native Aloha-Lactalbumin, Beta-Lactoglobulin and CMP The content of native alpha-lactalbumin, beta-lactoglobulin and CMP was analyzed by HPLC analysis at 0.4 ml/min. 25 μl filtered sample is injected onto 2 TSKgel3000PWxl (7.8 mm 30 cm, Tosohass, Japan) columns connected in series with attached precolumn PWxl (6 mm×4 cm, Tosohass, Japan) equilibrated in the eluent (consisting of 465 g MilliQ water, 417.3 g acetonitrile and 1 mL triflouroacetic acid) and using a UV detector at 210 nm.

Quantitative determination of the contents of native alpha-lactalbumin ($C_{alpha}$), beta-lactoglobulin ($C_{beta}$), and caseinomacropeptide ($C_{CMP}$) was performed by comparing the peak areas obtained for the corresponding standard proteins with those of the samples.

Samples that contain casein and/or fat are subjected to centrifugation at 62000 g for 30 minutes and the supernatant is used for the determination of determination of native alpha-lactalbumin, beta-lactoglobulin and CMP.

Example 1.3: Determination of the Degree of Denaturation

The quantitative analysis of the native whey protein content, i.e. the content of native alpha-lactalbumin, beta-lactoglobulin and caseinomacropeptide, was performed using the procedure described in Example 1.2 and the total protein content was quantified using the procedure described in Example 1.4.

The degree of denaturation was calculated as $(C_{total\ protein}-C_{native\ protein})/C_{total\ protein}*100\%$, wherein $C_{total\ protein}$ is the weight of total protein and $C_{native\ protein}$ is the weight of native protein.

Example 1.4: Determination of Total Protein

The total protein content (true protein) of a sample is determined by:

1) Determining the total nitrogen of the sample following ISO 8968-1/2|IDF 020-1/2-Milk—Determination of nitrogen content—Part 1/2: Determination of nitrogen content using the Kjeldahl method.
2) Determining the non-protein nitrogen of the sample following ISO 8968-4 ÅIDF 020-4-Milk—Determination of nitrogen content—Part 4: Determination of non-protein-nitrogen content.
3) Calculating the total amount protein as $(m_{total\ nitrogen}-m_{non\text{-}protein\text{-}nitrogen})*6.38$.

Example 1.5. Determination of Acid-Gel Strength

The acid-gel strength is determined by the following procedure:

1. Dissolve the protein powder in water and make 400 ml of suspension containing 3% protein w/w in water.
2. Stir the suspension for 1 hour using a magnetic bar stirrer.
3. Leave the suspension over night in refrigerator.
4. Homogenise the refrigerated suspension at 200 bars.
5. Store 100 mL of the suspension at 42 degrees C. for 30 minutes.
6. Add GDL (glucono-delta-lactone) to obtain a concentration of 0.6% (w/w) GDL and stir for 5 minutes using a magnetic bar stirrer.
7. Add samples to
   a) a tube for the pH logger and
   b) a Rheometer (MCR301 from Anton Paar with CC27 measuring system).

Rheometer Program:

Oscillation frequency: 1 Hz

Temperature profile:

42 degrees C. for 330 minutes

Cooling from 42 to 20 degrees C. In 20 minutes

Cooling from 20 to 5 degrees C. In 120 minutes i.e. total time in rheometer is 470 minutes The storage modulus [Pa] is automatically measured every minute and the sample pH (from the pH logger) is measured every 5 minutes.

The acid-gel strength is read as the storage modulus [Pa] after cooling to 5 degrees, i.e. the storage modulus [Pa] after 470 minutes.

Example 1.6: Determination of the Water Content of a Food Product

The water content of a food product is determined according to ISO 5537:2004 (Dried milk—Determination of moisture content (Reference method)). NMKL is an abbreviation for "Nordisk Metodikkomitè for Naeringsmidler".

Example 1.7: Determination of the Total Amount of Calcium and Total Amount of Magnesium, Respectively The total amount of calcium and the total amount of magnesium can be determined using a procedure in which the samples are first decomposed using microwave digestion and then the total amount of mineral(s) is determined using an ICP apparatus.

Apparatus:

The microwave is from Anton Paar and the ICP is an Optima 2000DV from PerkinElmer Inc.

Materials:

1 M HNO3

Yttrium in 2% HNO3

Calcium standard: 1000 micrograms/mL in 5% HNO3

Magnesium standard: 100 micrograms/mL in 5% HNO3

Pre-Treatment:

Weigh out a certain amount of powder and transfer the powder to a microwave digestion tube. Add 5 mL 1M HNO3. Digest the samples in the microwave in accordance with microwave instructions. Place the digested tubes in a fume cupboard, remove the lid and let volatile fumes evaporate.

Measurement Procedure:

Transfer the pre-treated sample to a digitube using a known amount of Milli-Q water. Add a solution of yttrium in 2% HNO3 to the digitube (about 0.25 mL per 50 mL diluted sample) and dilute to known volume using Milli-Q water. Analyze the samples on the ICP using the procedure described by the manufacturer.

A blind sample is prepared by diluting a mixture of 10 mL 1M HNO3 and 0.5 mL solution of yttrium in 2% HNO3 to a final volume of 100 mL using Milli-Q water.

At least 3 standard samples are prepared having concentrations which bracket the expected sample concentrations.

Example 1.8: Determination of the Total Amount of Lactose

The total amount of lactose is determined according to ISO 5765-2:2002 (IDF 79-2: 2002) "Dried milk, dried ice-mixes and processed cheese—Determination of lactose content—Part 2: Enzymatic method utilizing the galactose moiety of the lactose".

Example 1.9: Determination of Viscosity

The viscosity of liquid products was measured on a rheometer (Haake rheostress) with a bob/cup system.

The measurement was performed at 5 degrees C. (both the temperature of the liquid sample and the relevant parts of the rheometer had a temperature of 5 degrees C.).

Procedure:

1. Sample Preparation

Each sample is filled into bottles during processing and placed in the laboratory cooler (5° C.) to temperate for 1 day.

2. Setup

Set up the program for measurement of the product on the Haake rheostress, see method setup.

Install the bob/cup system. Check that the temperature of the water bath for HAAKE rheostress is set at 1° C., if not adjust the temperature.

3. Measuring

Only the sample that is to be analysed is removed from the cool storage, the sample bottle is gently turned upside down 3 times to homogenise the sample if it is phase separated during storage. Add 40 ml sample to the cup and start the data-sampling programme. A double repetition is made.

4. Cleaning

When the analysis is finished, dismantle the bob/cup system and dean it with water and soap and afterwards with cold water to temperate the system before the next measurement. Wipe the bob/cup system and install it again for the next sample.

Results

The viscosity is presented in the unit centipoise (cP). Based on the cP-value read after 90 sec. (t(seq)), an average of the double repetition is calculated. The higher the measured cP values are, the higher the viscosity.

Materials

For this procedure the following is required:
- Haake rheostress 1 rheometer
- Bob: Z34 DIN 53019 series
- Cup: Z34 DIN53018 series probes
- Water bath Haake K20/Haake DC50

Method Setup:

The parameters for the programme were as follows:
- Step 1: Measurement position
- Step 2: Controlled Stress of 1.00 Pa for 30 sec. at 5.00° C. Frequency of 1.000 Hz. 2 data points are collected
- Step 3: Controlled Rate of 50.00 I/s for 120 sec. at 5.00° C. 30 data points are collected
- Step 4: Lift apart Example 1.10: Measurement of the Dressing Retention of a Cottage Cheese The dressing retention of a cottage cheese is measured the following way.

Materials a) The plastic containers and plastic sieves used by Aria Foods amba for packaging "Apertina Classic cubes in brine" 200 g net weight. The plastic sieves have square holes (0.8 cm*0.8 cm) placed with distance of approx. 0.4 cm. between the sides of the square holes. The bottom of the sieve contains substantially square holes of 0.4 cm*0.4 cm and 0.2 cm*0.3 cm. The plastic sieve furthermore comprises a hook-like structure that makes it possible to attach the sieve to the edge of the container whereby liquid inside the sieve can flow into the container. The dressing is capable of escaping through the holes of the sieve and into the container while the drained curd particles are retained by the sieve.

b) A weight

The container and sieve are weighed separately ($w_{container,\ empty}$ and $w_{sieve,\ empty}$) and the sieve is then attached to the container so that dressing can drip freely into the container. The arrangement of the container and sieve is then placed on the weight.

Approx. 100 g of cottage cheese having a known weight percent of dressing and drained curd particles are filled into the sieve at time=0 seconds and the exact weight of the combination of cottage cheese, container and sieve ($w_0$) is measured. At time=180 sec. the sieve is removed from the weight and the weight of the container plus drained off dressing is measured ($w_{container,\ 180\ sec.}$).

The amount of drained off dressing is calculated as:

$$w_{Drained\ off\ dressing} = w_{container,180\ sec.} - w_{container,empty}$$

The total weight of the applied cottage cheese is calculated as:

$$w_{cottage\ cheese} = w_0 - w_{container,empty} - w_{sieve,emtpy}$$

The total weight of dressing is calculated as:

$$w_{total\ dressing} = w_{cottage\ cheese} * \text{weight percentage of dressing in the cottage cheese}$$

The dressing retention is then calculated as:

$$\text{Dressing retention} = (w_{total\ dressing} - w_{drained\ off\ dressing}) / w_{total\ dressing} * 100\%$$

The temperature of the cottage cheese during the test is 20 degrees C.

Example 2: Preparation of a Thickened Dairy Liquids

A series of thickened dairy liquid were prepared using a process as outlined in FIG. 1.

Each sample was prepared by high speed mixing a blend of skimmed milk and cream with a denatured whey protein powder containing acid-gellable whey protein aggregates (agWPC) and optionally also with NaCl.

The agWPC comprised approx. 50% (w/w) total protein and the total protein was composed of approx. 60% (w/w) acid-gellable whey protein aggregates and approx. 40% soluble whey protein, which mainly contained CMP, alpha-lactalbumin and beta-lactoglobulin. The non-protein dry-matter of the whey protein powder was primarily lactose, fat and minerals.

All mixing operations were performed at approx. 5 degrees C.

The resulting mixtures were allowed to hydrate for 1 hour at 5 degrees C. and subsequently subjected to homogenization at 200 bar at 65 degrees C. and heat-treated at 95 degrees C. for 5 minutes. The heat-treated mixtures were immediately cooled to 5 degrees C. and optionally mixed with NaCl. The total amount of added NaCl in the dairy liquid was approx. 1.7% (w/w).

The ingredients for each sample of the thickened dairy liquid are shown in the table below:

| | Sample | | | | |
|---|---|---|---|---|---|
| | 1 | 2 | 3 | 4 | 5 |
| Ingredients: (% w/w) | | | | | |
| Skimmed milk | 88.1 | 91.2 | 71.6 | 72.5 | 73.7 |
| Cream (38% fat) | 6.7 | 7.1 | 24.2 | 22.3 | 24.6 |
| agWPC | 3.5 | — | 2.5 | 3.5 | — |
| NaCl - before HT[1)] | 0.55 | 0.55% | 0.55% | 0.55% | 0.55% |
| NaCl - after HT[2)] | 1.15 | 1.15% | 1.15% | 0.95% | 1.15% |
| Characterisation: | | | | | |
| Fat (% w/w) | 2.7 | 2.7 | 9.4 | 8.6 | 9.4 |
| Protein (% w/w) | 5.0 | 3.3 | 4.3 | 4.8 | 3.3 |
| Carbohydrate (% w/w) | 5.5 | 4.5 | 4.3 | 4.9 | 5.2 |
| Total solids (% w/w) | 16.4 | 14.0 | 21.4 | 21.7 | 19.7 |

-continued

| | Sample | | | | |
|---|---|---|---|---|---|
| | 1 | 2 | 3 | 4 | 5 |
| pH | 6.6 | 6.5 | 6.6 | 6.7 | 6.6 |
| Viscosity (cP) | 77 | 4 | 126 | 288 | 9 |

[1)]The specified amount of NaCl is added together with the agWPC (before the heat-treatment).
[2)]The specified amount of NaCl is added after the heat-treatment.

The five samples were furthermore subjected to sensory testing and were found to be acceptable with no detectable off-flavours, precipitation or graininess. Both the mouthfeel and the measured viscosity of samples 2 and 5 were relatively low and these were not deemed properly thickened.

Example 3: Comparative Testing

In order to determine the significance of the presence of acid-gellable whey protein aggregates in the thickened dairy liquid, three variants of sample 1 were prepared wherein the agWPC was replaced by A) skimmed milk powder, B) milk protein concentrate, or C) WPC80. All three variants were designed to contain the same amount of total protein and fat as sample 1, however, replacing the protein provided by agWPC with protein from skimmed milk powder, milk protein concentrate, or WPC80.

The characteristics of the resulting samples are summarized below:

| | Sample | | | |
|---|---|---|---|---|
| | 1 | A | B | C |
| Alternative protein powder | No replacement | Skimmed milk powder | Milk protein concentrate | WPC80 |
| pH | 6.6 | 6.7 | 6.6 | 6.6 |
| Viscosity (cP) | 77 | 9 | 7 | 71 |
| Dressing retention after 180 sec. (% w/w)[1)] | 69 | 42 | 44 | 42 |
| Mouthfeel | 6 | 3 | 2 | 3 |
| Graininess | 0 | 0 | 0 | 3 |
| Precipitate | 0 | 0 | 0 | 5 |

[1)]45% (w/w) thickened dairy liquid mixed with 55% (w/w) of the drained curd particles obtained from Example 4; the retention was measured according to Example 1.10.

As can be seen, samples A and B both suffered from a low viscosity and a low mouthfeel when compared to sample 1. Sample C had a higher measured viscosity but turned out to have a pronounced graininess and a high degree of precipitation.

Figure 3A:
FIGS. 3*a* and 3*b* show an example of a thickened liquid having a high level of graininess which typically is obtained when native whey protein concentrate is used to generate viscosity (FIG. 3*a*), and a nice smooth thickened liquid which is characteristic of the present invention (FIG. 3*b*).
Figure 3B:
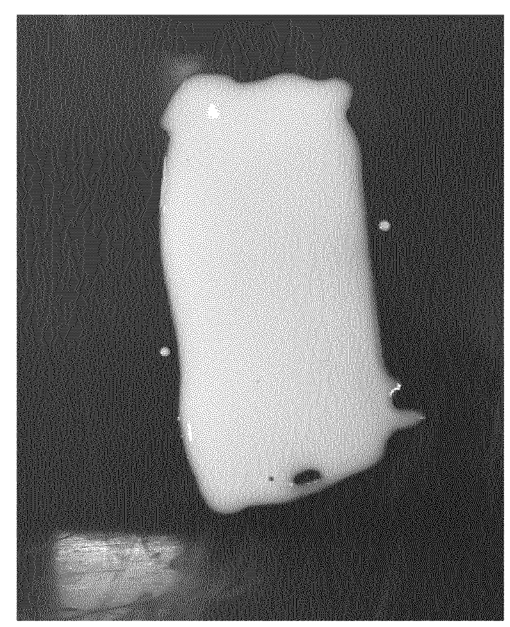

FIGS. 3*a* and 3*b* show an example of a thickened liquid having a high level of graininess similar to that of Sample C (FIG. 3*a*) and a nice, smooth thickened liquid which is characteristic of Sample 1 (FIG. 3*b*—the present invention).

Samples A, B and C all had a poorer retention in the cottage cheese than the sample 1. The poor retention of sample C was particularly surprising given its relatively high measured viscosity.

Example 4: Preparation of Cottage Cheeses

The drained curd particles were prepared conventionally by curding skimmed milk using a combination of rennet and starter culture, cutting the obtained curd into cubes having a side length of approx. 1 cm and finally allowing the cut curd to drain off whey.

The obtained drained curd particles contained 0.4% (w/w) fat, 1.6% (w/w) lactose, and approx. 19% (w/w) protein. The solids content of the drained curd particles was approx. 22% (w/w).

Samples of dressing-containing cottages cheese were prepared by gently mixing 55% (w/w) of the drained curd particles with the 45% (w/w) of the above mentioned thickened dairy liquids (acting as dressing), i.e. 55 g curd particles mixed with 45 g dressing.

The cottage cheese samples were subjected to sensory testing and measurement of the ability of the cottage cheese to retain the dressing between the curd particles. The cottage cheeses based on dressings containing salt-thickened acid-gellable whey protein aggregates showed a much better covering effect (adherence to and ability to cover the curd particles) than the dressings which contained skimmed milk powder, milk protein concentrate, or WPC80.

The invention claimed is:

1. A heat-treated, thickened dairy liquid suitable for use as a cottage cheese dressing comprising:

(i) added chloride salt of $Na^+$, $K^+$, and/or $Ca^{2+}$, (ii) a total amount of carbohydrate-based stabilisers of at most 0.2% (w/w), (iii) a pH in the range of 6.0-8.0 at 20 degrees C., (iv) a viscosity in the range of 20-400 cP at 5 degrees C., and (v) a total amount of $Na^+$, $K^+$, $Ca^{2+}$, and $Cl^-$ in the range of 0.4-3.8% (w/w), and wherein the thickened dairy liquid is obtainable by a method comprising:

(a) providing a liquid dairy base, (b) optionally, homogenizing the liquid dairy base, (c) heat-treating the liquid dairy base at a temperature of at least 70 degrees C. for a duration sufficient to obtain at least a factor $10^5$ reduction in a number of colony forming units of the liquid dairy base, and (d) cooling the liquid dairy base to at most 10 degrees C., to obtain the thickened dairy liquid, and wherein said method furthermore comprises:

adding a chloride salt of $Na^+$, $K^+$ and/or $Ca^{2+}$ to the liquid dairy base before and/or after the heat-treatment of step (c) in an amount sufficient to obtain a total amount of added chloride salt of $Na^+$, $K^+$ and $Ca^{2+}$ in a range of 0.1-3% (w/w) to thicken the heat-treated dairy liquid;

further wherein said liquid dairy base provided in step (a) comprises (I) a pH in the range of 6.0-8.0, (II) milk fat, milk protein, and acid-gellable whey protein aggregates, and (III) a total amount of said acid-gellable whey protein aggregates in the range of 0.2-3% (w/w), and wherein:

(1) said acid-gellable whey protein aggregates are denatured proteins provided by heat-denaturation of a demineralised whey protein solution having a pH in the range of 6.0-8.0, (2) said heat-denaturation is performed at a temperature of at least 68 degrees C. for at most 60 minutes with or without shear forces acting on the whey protein during the denaturation, and (3) said acid-gellable whey protein aggregates are quantifiable by measurement following a centrifugation of the liquid dairy base at 62000 g for 30 minutes and said acid-gellable whey protein aggregates remain in the supernatant after the centrifugation of the liquid dairy base.

2. The heat-treated, thickened dairy liquid according to claim 1, comprising at least 5% (w/w) protein.

3. The heat-treated, thickened dairy liquid according to claim 1 comprising at most 10% (w/w) fat.

4. The heat-treated, thickened dairy liquid according to claim 1, wherein the dairy base of step a) contains 0.4-3% (w/w) acid-gellable whey protein aggregates.

5. The heat-treated, thickened dairy liquid according to claim 1, wherein the chloride salt of $Na^+$, $K^+$, and/or $Ca^{2+}$ is added prior to the heat treatment in an amount in the range of 0.4-1.2% (w/w).

6. The heat-treated, thickened dairy liquid according to claim 1, wherein the dairy base of step a) contains a total amount of carbohydrate-based stabilisers of at most 0.2% (w/w).

7. The heat-treated, thickened dairy liquid according to claim 1, wherein the dairy base comprises at least 5% (w/w) protein.

8. The heat-treated, thickened dairy liquid according to claim 1, wherein the dairy base comprises at most 10% (w/w) fat.

9. The heat-treated, thickened dairy liquid according to claim 1, wherein at least 10% (w/w) of the total amount of added chloride salt of $Na^+$, $K^+$, and/or $Ca^2$ is added before the heat-treatment and the rest is added after the heat-treatment.

10. The heat-treated, thickened dairy liquid according to claim 1, wherein the added chloride salt of $Na^+$, $K^+$ and/or $Ca^{2+}$ comprises one or more salts selected from the group consisting of NaCl, KCl, and $CaCl_2$.

* * * * *